Aug. 6, 1946.   A. G. HERRESHOFF   2,405,424
FASTENING DEVICE
Filed July 6, 1942

INVENTOR
ALEXANDER G. HERRESHOFF
BY
ATTORNEYS

Patented Aug. 6, 1946

2,405,424

UNITED STATES PATENT OFFICE 2,405,424

FASTENING DEVICE

Alexander G. Herreshoff, Grosse Pointe, Mich., assignor to Chrysler Corporation, Highland Park, Mich., a corporation of Delaware Application July 6, 1942, Serial No. 449,868

5 Claims. (Cl. 151—29)

This invention relates to fastening or securing devices for connecting together component parts of machines, machine elements, or other structures. My invention is especially advantageous for connecting together the bearing portions of an engine connecting rod, especially for aircraft engines wherein it is desired to stress the connecting rod bolts a relatively great amount and to an exacting specification.

A further object is to provide a fastening device having a relatively simple and effective locking means for maintaining the parts in assembled relationship against danger of the fastening device releasing its connection.

Another object is to provide an improved fastening device which is capable of assembly in locations where there is little room for the operator. For example, in the assembly of connecting rods of aircraft engines my device is adapted for assembly in a direction axially of the connecting rod where access is relatively easy in contrast with other devices requiring the assembly of parts in a direction transversely of the connecting rod.

An additional object is to provide a fastening device which is free from parts tending to vibrate or shake loose when subjected to use such as in conjunction with bearing caps of engine connecting rods.

Further objects and advantages reside in the novel combination and arrangement of parts more particularly hereinafter described and claimed, reference being had to the accompanying drawing in which:

Figure 1:
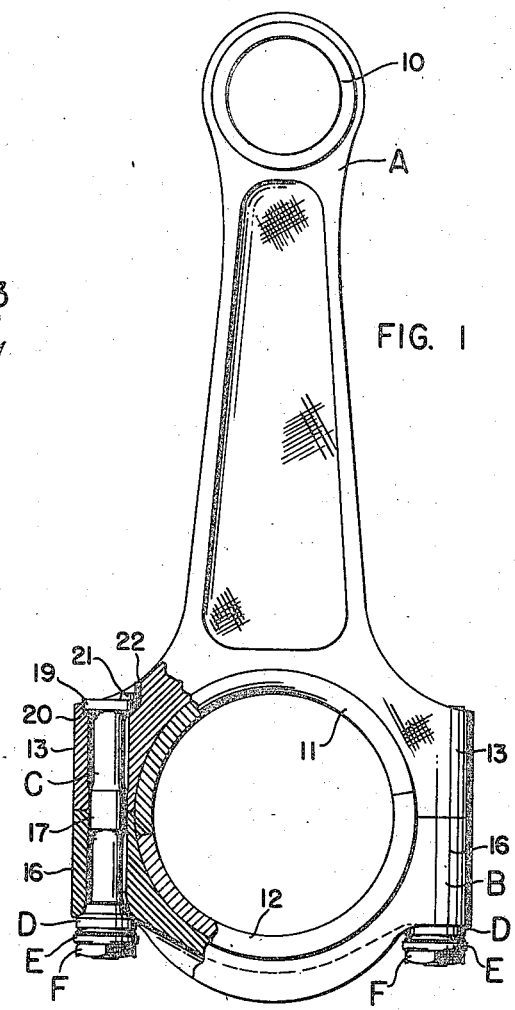
Fig. 1 is a front elevational view of a connecting rod assembly showing my fastening device applied thereto.
Figure 4:
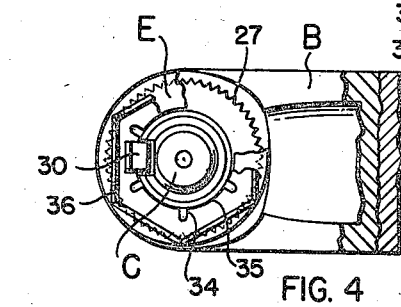
Fig. 4 is a bottom plan view taken as indicated by line 4—4 of Fig. 2.

Referring to the drawings I have illustrated my invention as applied to an aircraft engine connecting rod having a main body portion A and bearing cap B. The portion A has the usual piston pin bearing portion 10 at one end and a half-bearing portion 11 at the other end for receiving the crankshaft throw. A companion half-bearing 12 is formed in cap B, it being desired to tightly assemble the cap and portion A together as illustrated in Fig. 1 by utilizing body A as an abutment and cap B as a reaction-taking member.

The portion A is provided with bosses 13 each having an opening 14 therethrough in alignment with an opening 15 extending through a boss 16 of cap B. A bolt C extends through openings 14 and 15 and has an intermediate pilot portion 17 engaging portions of openings 14 and 15 adjacent the face engagement of cap B with rod portion A as at 18.

At its upper end each bolt C has an enlarged annular head portion 19 seated at abutment 20 formed on the upper end of boss 13, this bolt head having integrally therewith an annular lug 21 upstanding from the upper face of the bolt head and arranged to laterally overhang the same at one point or region in the periphery of the bolt head, the lug 21 being of much less diameter than the bolt head. The lug 21 projects into the groove 22 of portion A, this groove having an arcuate formation to fit the side of the overhanging portion of the lug 21 thereby allowing ready installation of bolt C axially downwardly but holding the bolt against rotation in either direction.

The lower end portion of opening 15 is formed with a frusto-conical seat 23 for a correspondingly formed seat portion of a nut D which is internally threaded at 24 to fit the threads 25 on the lower end of bolt C. The upper end portion of nut D projects, preferably with clearance, into the lower end of opening 15 and has an annular body portion 26 extending downwardly from the seat portion to the annular planar end face 27. Adjacent this face the body portion 26 has an annular side wall which is formed externally with an annular series of contiguously disposed axially extending flutes or serrations 27'. These serrations are very fine in the sense that there are a great many of them arranged closely together so as to obtain a very sensitive vernier-like locking adjustment for tensioning bolt C.

Seated on the end face 27 is a locking cap E which, for this purpose, is provided with an annular body portion 28 disposed transversely of the bolt C and having a central opening 29 through which the threaded end of the bolt may be freely extended. The cap is provided with a tongue 30 which, prior to final locking assembly of the whole device, extends in a direction axially of the bolt and is offset inwardly of the opening 29 so as to lie in a groove 31. This groove extends axially of the bolt C for a portion of the threaded length thereof and is open at the bottom or threaded end of the bolt so as to readily receive the tongue 30 when the cap E is assembled. This cap is provided with an axially extending annular flange 32 which projects upwardly at right angles from the periphery of the annular body portion 28, the flange overlying the lower end portion of nut D and being internally formed with flutes or serrations 33 complemental with the serrations 27'. Thus serrations 33 are equal in number to serrations 27' and similarly directed so that the serrations of cap E will fit the serrations of nut D and provide very small increments of locking rotatable adjustment between these parts.

Below or outwardly of the cap E, I provide a second nut F in the form of a locking member. In the present instance I employ a well-known commercial type of nut lock known in the trade as Palnut. This nut F comprises an axially perforated transverse body of dished formation having a plurality of circumferentially spaced radially extending kerfs or slots 34 forming the dished spring wings or body segments 35. These wings are of progressive thread-like curvature and of such radial length such that the nut F will receive the bolt thread 25. The outer margin of the nut-slotted body is struck downwardly in a direction oppositely to that of the flange 32 to form a non-cylindrical flange 36. Usually the nut F has its flange formed by six flat portions for convenient engagement by a wrench employed to turn the nut.

In assembling my locking device, the parts A and B are assembled with the bolts C positioned as illustrated. Each bolt is held against rotation by reason of the lug and groove lock at 21, 22. Then the nut D is threaded on the bolt C and engaged at seat 23. The serrations 27' provide means for engaging nut D by a suitable wrench. The nut D is then turned until the desired amount of tension stress is imparted to bolt C, it being understood that both of the nuts D are tensioned preferably by alternate increments of rotation so that their action is balanced during the assembly of the connecting rod as a whole.

Then the cap E is inserted over the threaded end of the bolt C, the body portion 28 engaging the nut face 27 and the tongue 30 sliding in the groove 31 until serrations 33 interlock with serrations 27'. In the event that these serrations do not engagingly align then the nut D is given a slight rotation. In no instance will it be necessary to rotate the nut D more than half the angular distance between a pair of contiguous serrations. By forming the serrations very fine, as illustrated, the desired close specification for tensioning bolt C may be preserved within extremely close limits. Cap E and nut D are thus locked together against relative rotation.

After cap E is positioned in place as aforesaid, the nut F is assembled by threading the same on the lower end of the bolt C. When the nut F engages the body portion 28 of cap E, then the nut F cannot move further axially but by further rotation of nut F the dished wings 35 will be sprung so as to follow the threads 27 and in so doing the wings will be forced to lose some of their dished formation and to bite into the threads 25 thereby securely locking cap E against axial displacement.

Figure 3:
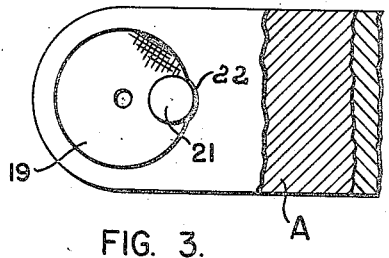
Fig. 3 is a top plan view taken as indicated by line 3—3 of Fig. 2.
Figure 2:
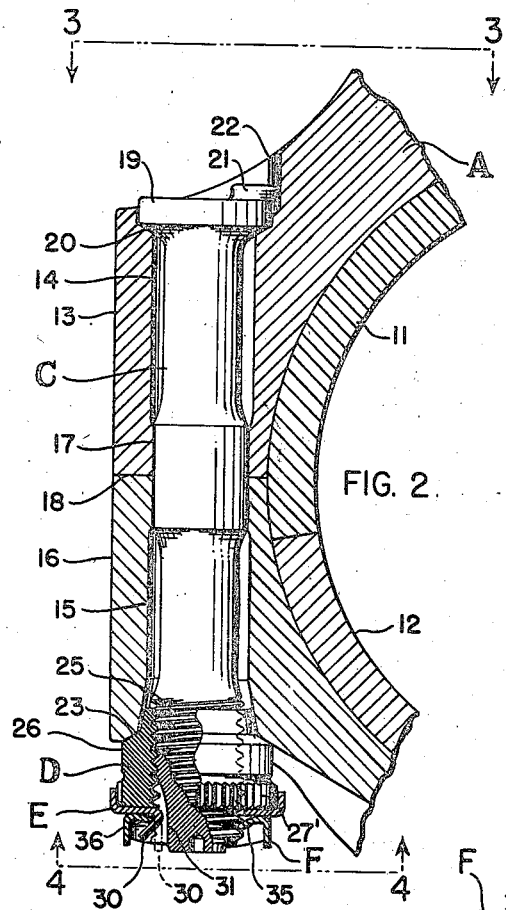
Fig. 2 is an enlarged sectional view of a portion of the Fig. 1 connecting rod taken to illustrate my fastening device.
Figure 5:
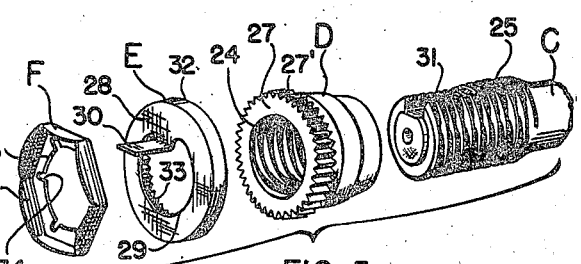
Fig. 5 is an exploded perspective view of the fastening elements.

After nut F is positioned in locking relation as aforesaid, the tongue 30 is bent outwardly and inwardly so as to engage one of the segments 35 of nut F and in this manner it will be impossible for nut F to accidentally back off the threads 25 or even to loosen its locking grip. By preference the tongue 30 is bent about 45° from its Fig. 5 position rather than into face engagement with one of the segments 35. This securely holds the nut F and facilitates bending the tongue back to its original position when it is desired to disassemble the parts. Of course, the 45° bending is not important as any angle of bending is satisfactory as long as the tongue overlies the edge of one of the segments 35. By appropriately proportioning the parts, the tongue 30 may be made to project slightly beyond slot 31, when nut F is assembled, so as to facilitate the bending over of the tongue as indicated by the dotted line showing of the tongue in Fig. 2. However, this is not entirely necessary as the tongue may be formed so as to be spaced outwardly from the bottom of groove 31 when assembled, thereby accommodating ready access by any suitable tool for bending the tongue into locking position. Tongue 30 serves to prevent rotation of cap E relative to the bolt and to lock the nut F against accidental backing off from its desired locking position. It will be understood that each of the illustrated locking devices is assembled in the general manner as outlined above.

My fastening means may, of course, be employed to assemble parts of structures other than connecting rod parts. However, my invention is particularly adapted for connecting rod bearing cap assemblies, especially for aircraft engines, as all parts of the fastening device are assembled in a direction axially of the bolt C. Space limitations do not conveniently accommodate the assembly of parts in a direction transverse to the axis of bolt C. Furthermore there are no parts to shake loose or to vibrate under the severe action of the connection rod.

All references to terminology of position, such as is used in my specification and claims, is employed in a relative sense for convenience and clarity of expression as obviously the fastening device may extend in any direction other than that illustrated.

By arranging the upper end portion of nut D with clearance in the opening 15, the stresses arising from seating the nut at the frusto-conical seat 23 tend to equalize along the length of the threads of the nut thereby avoiding tendency to unduly stress these threads at the upper end portion of the nut.

The specific anchoring means shown at the upper end of the bolt is further illustrated and claimed in the copending application of John P. Butterfield, Serial No. 449,867, filed July 6, 1942.

I claim:

1. In a locking device for a plurality of members, a bolt having a threaded portion and an axial slot in the threaded portion, a nut adapted to engage the threaded portion of the bolt and having axially extending raised portions entirely about the periphery, a cap having raised portions entirely about an inner surface adapted to engage the raised portions of the nut so as to prevent relative rotation of the nut and the cap and to permit relative axial movement and also having a tongue adapted to project into the axial slot of the bolt to prevent relative rotation of the cap and the bolt, and a locking member adapted to be engaged by the tongue of the cap so as to be prevented from rotating with respect to the bolt and having a body portion deformable into very tight engagement with the threaded portion by rotation of the locking member against the cap.

2. In a fastening device for a plurality of members, one of the members having an abutment, and another of the members having a seat; a tension-taking bolt having a head adjacent one end thereof adapted to engage said abutment and having a portion adjacent its other end threaded, said threaded end portion of said bolt being formed with a slot extending in a direction axially of said bolt, a nut threaded to engage said threaded bolt portion and having a portion thereof adapted to engage said seat for tensioning said bolt thereby to fasten said members together, said nut having adjacent an end face thereof an annular side wall portion thereof formed externally with a circumferential series of contiguously disposed serrations extending in the direction of the axis of said bolt, a cap having an annular body portion adapted to pass over the threaded end portion of said bolt and adapted, when assembled on said bolt, to seat on the said end face of said nut, said cap having an axially extending annular flange adapted to overlie an end portion of said nut and formed internally with a circumferential series of contiguously disposed serrations for engagement with the said serrations of said nut, said cap having a tongue projecting from its said body portion adjacent the aperture thereof and adapted, when said cap is assembled on said bolt as aforesaid, to lie in said bolt slot and extend from said cap body portion in a direction axially of said bolt toward said other end of said bolt, a lock nut adapted to seat on the said cap body portion, said lock nut having a deformable body portion apertured for threadedly engaging the threads of said bolt and adapted to be deformed into springing locking engagement with said bolt threads when said lock nut is turned on said bolt after being seated on said cap, said tongue adapted to be bent outwardly from said bolt slot so as to overlie the said body portion of said lock nut.

3. In a locking device for tensioning a bolt of the type adapted to fasten together bearing parts of a connecting rod, said bolt having a threaded end portion provided with a slot, a serrated nut threaded to engage said bolt threads and to bear against one of said parts for tensioning said bolt, a cap apertured to receive said bolt end portion and having a portion thereof serrated to engage the serrations of said nut thereby to lock said cap and nut together against relative rotation, a locking element threaded to engage said bolt threads and to be seated on said cap, said cap having a tongue projecting therefrom so as to be adapted for locking relationship with said locking element, said tongue having a portion thereof adapted to be disposed in said bolt slot thereby to prevent rotation of said cap relative to said bolt.

4. In a locking device for a plurality of members, a bolt having a threaded portion and an axial slot in the threaded portion, a nut adapted to engage the threaded portion of the bolt, a cap having a portion adapted to engage the bolt slot to prevent relative rotation of the cap with respect to the bolt, said nut and cap having interengaging portions preventing relative rotation but permitting relative axial movement, and a locking member adapted to engage the threaded portion of the bolt and to prevent axial movement of the cap and to be engaged by the said portion of the cap so as to be prevented from rotating with respect to the bolt.

5. In a locking device for a plurality of members, a bolt having a threaded portion and an axial slot in the threaded portion, a nut adapted to engage the threaded portion of the bolt and having axially extending raised portions entirely about the periphery, a cap having raised portions entirely about an inner surface adapted to engage the raised portions of the nut so as to prevent relative rotation of the nut and the cap and to permit relative axial movement and also having a tongue adapted to project into the axial slot of the bolt to prevent relative rotation of the cap and the bolt, and a locking member having a dished portion deformable into very tight engagement with the threaded portion of the bolt by straightening of the dished portion caused by rotation of the locking member against the cap, the tongue on the cap having a portion bendable outward so as to engage the locking member for preventing rotation of the same with respect to the bolt.

ALEXANDER G. HERRESHOFF.